United States Patent
Ban et al.

(10) Patent No.: US 10,807,541 B2
(45) Date of Patent: Oct. 20, 2020

(54) SURFACE STRUCTURE OF ARTICLE

(75) Inventors: Akane Ban, Sagamihara (JP); Makoto Tamuraya, Isehara (JP); Takashi Takeuchi, Atsugi (JP); Yeon-Yi Kang, Atsugi (JP); Hideo Fujimoto, Nagoya (JP); Akihito Sano, Gifu (JP); Hiromi Mochiyama, Tsukuba (JP); Naoyuki Takesue, Hino (JP); Yoshihiro Tanaka, Nagoya (JP)

(73) Assignees: NISSAN MOTOR CO., LTD., Yokohama-shi (JP); NATIONAL UNIVERSITY CORPORATION NAGOYA INSTITUTE OF TECHNOLOGY, Nagoya-shi (JP)

( * ) Notice: Subject to any disclaimer, the term of this patent is extended or adjusted under 35 U.S.C. 154(b) by 122 days.

(21) Appl. No.: 13/129,217

(22) PCT Filed: Nov. 17, 2009

(86) PCT No.: PCT/JP2009/069498
§ 371 (c)(1),
(2), (4) Date: May 13, 2011

(87) PCT Pub. No.: WO2010/055948
PCT Pub. Date: May 20, 2010

(65) Prior Publication Data
US 2011/0287220 A1    Nov. 24, 2011

(30) Foreign Application Priority Data

Nov. 17, 2008   (JP) ................................ 2008-293138

(51) Int. Cl.
  *B60R 13/02*  (2006.01)
  *B44C 5/00*  (2006.01)
  *B44C 1/24*  (2006.01)

(52) U.S. Cl.
  CPC ............ *B60R 13/0243* (2013.01); *B44C 1/24* (2013.01); *B44C 5/00* (2013.01); *Y10T 428/24355* (2015.01)

(58) Field of Classification Search
  CPC .................................................. B60R 13/0243
  (Continued)

(56) References Cited

U.S. PATENT DOCUMENTS 5,270,097 A * 12/1993 Amemiya ................ B41M 3/06
                                                             428/151
5,804,285 A *  9/1998 Kobayashi ................ B32B 3/30
                                                             428/172

(Continued)

FOREIGN PATENT DOCUMENTS

CN    1490155 A    4/2004
CN    1657277 A    8/2005

(Continued)

OTHER PUBLICATIONS

Chinese Office Action, dated Dec. 4, 2014, 4 pages.

*Primary Examiner* — Samir Shah
*Assistant Examiner* — Tong Guo
(74) *Attorney, Agent, or Firm* — Foley & Lardner LLP (57) ABSTRACT

In the surface structure of an article 7 according to the present invention, a plurality of convex portions 11 are so disposed on a surface 9 as to have intervals relative to each other and a plurality of fine convex portions 21 having a diameter d and a height h smaller than those of the concave portion 11 are formed on the surface of at least the edge portion 15 of the concave portion 11. By this, when a hand touches the surface 9 of the article 7, the proper number of convex portions 21 abut on a linear object 25 constituting a fingerprint 23 of a hand's finger, to thereby allow the human being to obtain a delicate-and-soft touch feeling.

11 Claims, 7 Drawing Sheets

(58) Field of Classification Search
USPC .................................................. 428/167, 141
See application file for complete search history.

(56) References Cited

U.S. PATENT DOCUMENTS

| | | | |
|---|---|---|---|
| 6,136,415 A * | 10/2000 | Spengler | 428/157 |
| 7,318,613 B2 | 1/2008 | Hiroe et al. | |
| 7,608,316 B2 * | 10/2009 | Okajima et al. | 428/122 |
| 2003/0030188 A1 * | 2/2003 | Spengler | B29C 37/0032 |
| | | | 264/458 |
| 2004/0106346 A1 * | 6/2004 | Zafiroglu | B32B 3/28 |
| | | | 442/149 |
| 2005/0089671 A1 * | 4/2005 | Kubota | B29C 33/424 |
| | | | 428/143 |
| 2005/0186396 A1 * | 8/2005 | Okajima et al. | 428/167 |
| 2005/0208275 A1 * | 9/2005 | Abe | B32B 27/20 |
| | | | 428/195.1 |
| 2007/0020437 A1 | 1/2007 | Yamauchi et al. | |
| 2007/0082176 A1 | 4/2007 | Schaefer | |
| 2007/0253750 A1 | 11/2007 | Okamoto et al. | |
| 2007/0261224 A1 * | 11/2007 | McLeod | 29/428 |
| 2008/0305305 A1 * | 12/2008 | Sano et al. | 428/168 |
| 2009/0047465 A1 * | 2/2009 | Zafiroglu | B29C 43/222 |
| | | | 428/97 |
| 2011/0177303 A1 * | 7/2011 | Suehiro | B32B 3/10 |
| | | | 428/195.1 |

FOREIGN PATENT DOCUMENTS

| | | |
|---|---|---|
| CN | 101063860 A | 10/2007 |
| CN | 101318389 A | 12/2008 |
| DE | 20 2004 019 330 U1 | 3/2005 |
| EP | 2 014 435 A1 | 1/2009 |
| JP | 3-13232 U | 2/1991 |
| JP | 9-239739 A | 9/1997 |
| JP | 2002-146087 A | 5/2002 |
| JP | 2002-263566 A | 9/2002 |
| JP | 2005-263197 A | 9/2005 |
| JP | 2006-68972 A | 3/2006 |
| JP | 2007-22000 A | 2/2007 |
| JP | 2007-528816 A | 10/2007 |
| JP | 2008-302549 A | 12/2008 |
| WO | WO 2007/144469 A1 | 12/2007 |

* cited by examiner

SURFACE STRUCTURE OF ARTICLE

TECHNICAL FIELD

The present invention relates to a surface structure of an article.

BACKGROUND ART

Ordinarily, interior components are disposed in a vehicular room of an automobile, an electric train and the like, thereby improving external view or touch feeling (for example, refer to Patent Literature 1 and the like).

A vehicular interior component described in this Patent Literature 1 is applied to a lengthy member such as vehicular weather strip and the like, and is formed with a lengthy molded article main body and an ornament layer disposed on the surface of the lengthy molded article main body. A plurality of linear groove portions extending linearly are formed on the surface of this ornament layer. The linear groove portions are disposed at specified intervals in a direction perpendicular to a longitudinal direction of the lengthy member. Many fine concave-convex patterns smaller than a concave-convex shape defined by the linear groove portion are formed on a surface of the linear groove portion.

CITATION LIST

Patent Literature

[Patent Literature 1]
Japanese Patent Application Laid-Open No. 2005-263197

SUMMARY OF INVENTION

Technical Problem

However, with respect to the vehicular interior component shown in the above background art, the size of the linear groove portion and the size of the concave-convex pattern formed on the surface of the linear groove portion are not specifically defined. Therefore, when a hand's finger of a human being touches the surface of the interior component, it is difficult for the human being to obtain a delicate-and-soft touch feeling which is felt by the fingerprint of the hand's finger.

Therefore, the present invention has been made in view of the above circumstances. It is an object of the present invention to provide a surface structure of an article which allows a human being to obtain a delicate-and-soft touch feeling which is felt by the fingerprint of the hand's finger of the human being.

Solution to Problem

For achieving the above object, the surface structure of an article according to the present invention has such a main feature that a plurality of fine convex portions each having a diameter in a range of 15 µm to 40 µm are formed on the surface of the structure.

Advantageous Effects of Invention

In the surface structure of an article according to the present invention, a plurality of fine convex portions each having a diameter in a range of 15 µm to 40 µm are formed on the surface of the structure. Therefore, when a finger of the human being touches the surface, a delicate-and-soft touch feeling which is felt by the fingerprint of the hand's finger can be obtained.

BRIEF DESCRIPTION OF DRAWINGS

FIG. 5 is a cross sectional view where FIG. 4 is enlarged.

DESCRIPTION OF EMBODIMENTS

Embodiment

Hereinafter, an embodiment of the present invention is to be set forth based on drawings.

Figure 1:
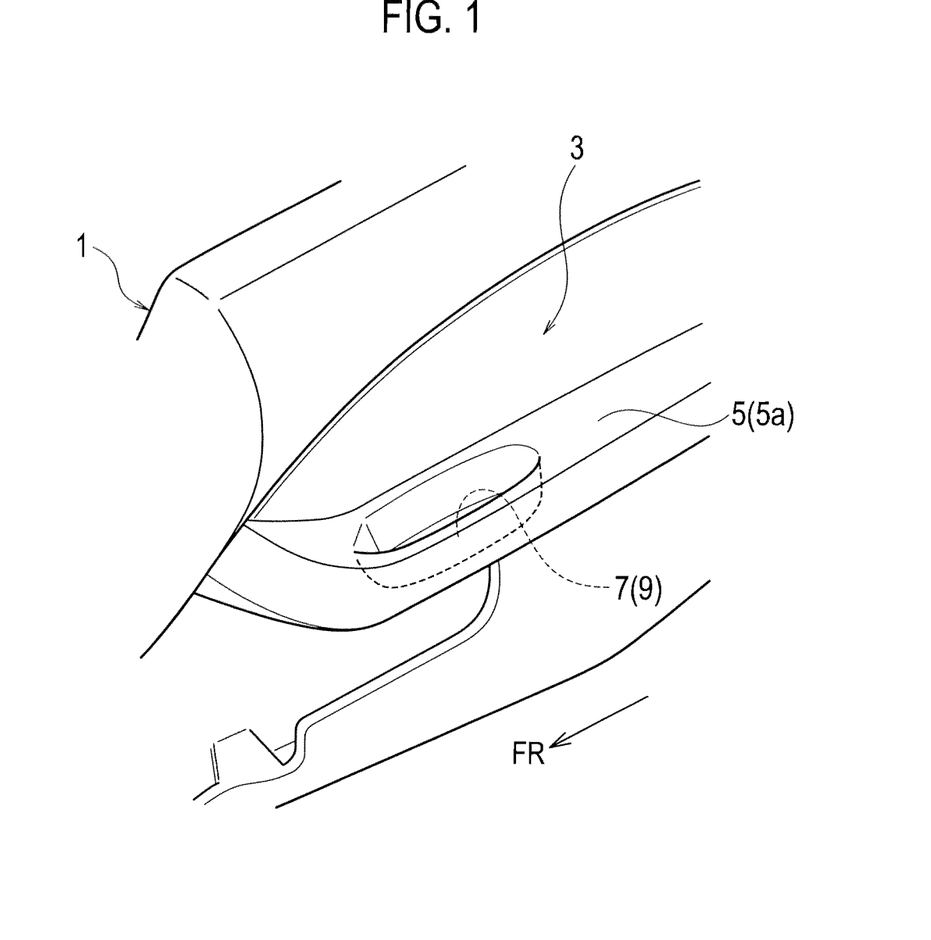
FIG. 1 is a perspective view of a door equipped with a door trim according to an embodiment of the present invention, where the door is viewed from a vehicular inside.

FIG. 1 is a perspective view of a door equipped with the door trim according to the embodiment of the present invention, where the door is viewed from a vehicular inside.

A door 1 has a door main body where an outer panel and an inner panel are joined with each other, and a door trim 3 which is fitted to the vehicular inside of the door main body. An armrest 5 protruding to the vehicular inside is disposed at a center portion in a height direction of the door trim 3, and a door grip 7 for a passenger to grip for opening and closing the door 1 is disposed on an upper face 5a of the armrest 5. In the upper face of the armrest 5, the door grip 7 is disposed in a form of concave. On an internal wall face 9 in the vehicular inside among internal wall faces defining the door grip 7, a below-described surface structure according to the embodiment of the present invention is disposed.

Figure 2:
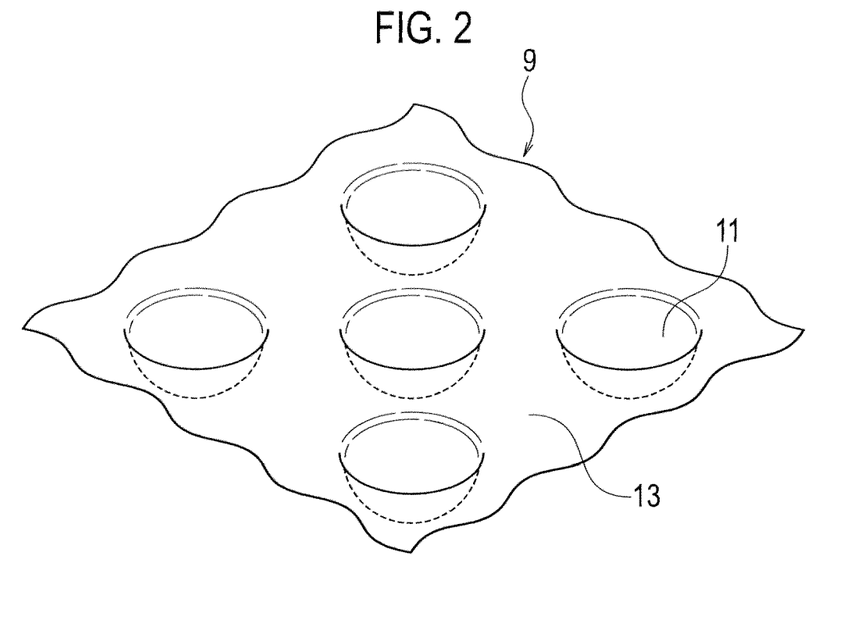
FIG. 2 is a perspective view where the surface of the door grip in FIG. 1 is enlarged.
Figure 3:
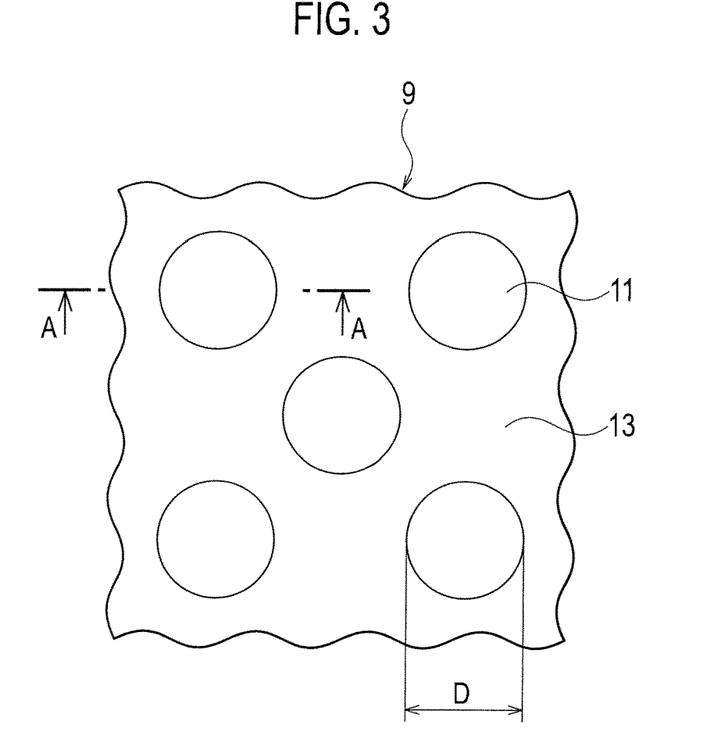
FIG. 3 is a plan view of FIG. 2.
Figure 4:
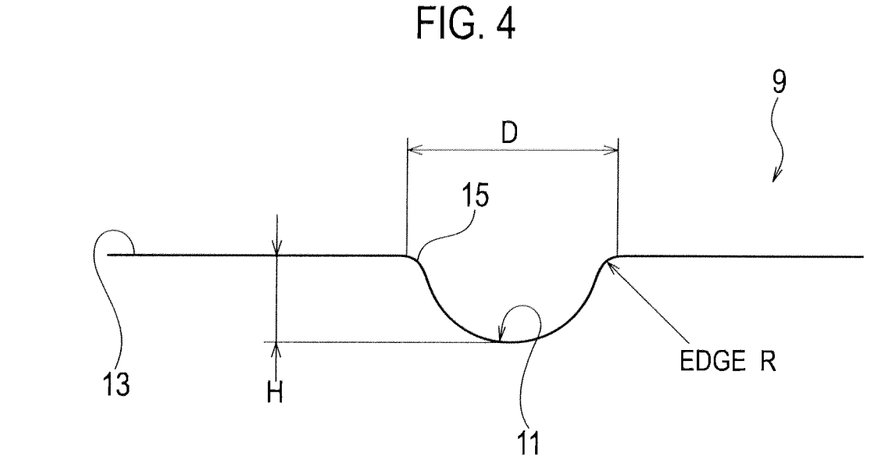
FIG. 4 is a cross sectional view taken along the line A-A in FIG. 3.

FIG. 2 is a perspective view where the surface of the door grip 7 in FIG. 1 is enlarged, FIG. 3 is a plan view of FIG. 2, and FIG. 4 is a cross sectional view taken along the line A-A in FIG. 3.

On the surface of the internal wall face 9 of the door grip 7, a plurality of concave portions 11 are disposed at specified intervals relative to each other. These concave portions 11 are each formed substantially in a hemispherical shape concaved toward a backface side. Between the concave portions 11, 11, a flat plane portion 13 is formed. Moreover, a diameter D of the concave portion 11 is preferably in a range of 0.5 mm to 2.0 mm while a depth H of the concave portion 11 is preferably in a range of 60 μm to 350 μm. Here, the diameter D of the concave portion 11 denotes a distance between outermost stop ends of respective edges R of the edge portions 15 while the depth H of the concave portion 11 denotes a distance from a bottom face of the concave portion 11 to the plane portion 13 of the internal wall face. Moreover, the edge R (curvature radius) of the cross section of the edge portion 15 in the vicinity of the surface of the concave portion 11 is preferably in a range of 1 mm to 2 mm.

Figure 5:
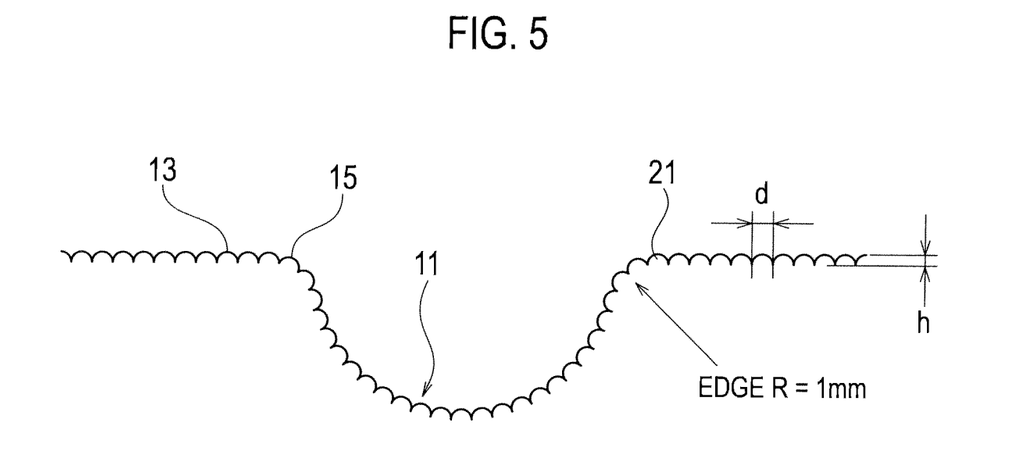

FIG. 5 is a cross sectional view where FIG. 4 is enlarged.

Though omitted from FIG. 4, a plurality of fine convex portions 21 each formed having a diameter d smaller than the diameter D of the concave portion 11 are continuously formed on the whole surface of not only the edge portion 15 of the concave portion 11, but also the entire concave portion 11 and the plane portion 13. These convex portions 21 are each formed in a hemisphere shape protruding to the surface side. The diameter d is preferably in a range of 15 μm to 40 μm while the height h is preferably in a range of 15 μm to 30 μm. In addition, the convex portion 21 may be formed at least in the edge portion 15 of the concave portion 11. However, as shown according to the present embodiment, the convex portion 21 is preferably formed also in the entire concave portion 11 and in the plane portion 13 other than the concave portion 11.

Figure 6:
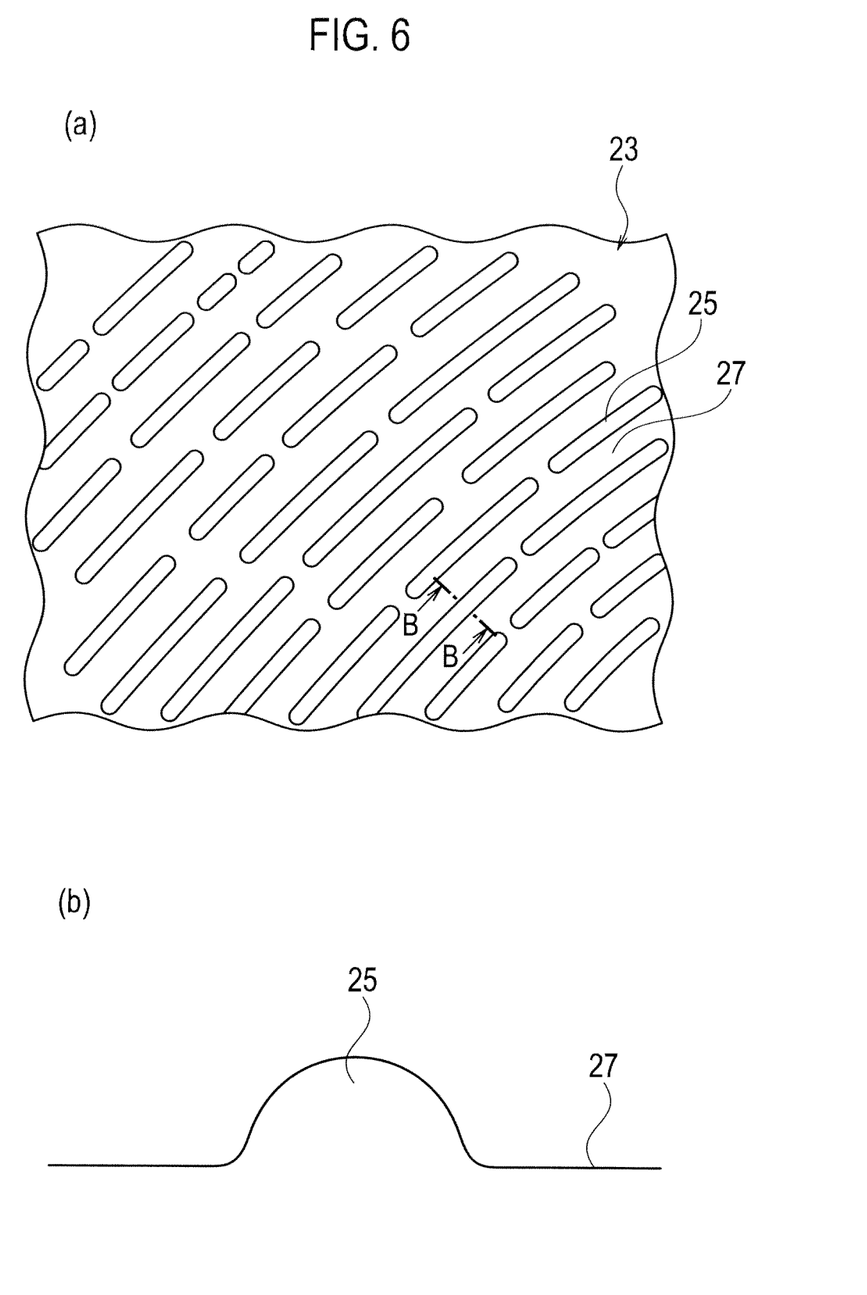
FIG. 6 is a schematic view where a fingerprint of a hand's finger of the human being is enlarged.

FIG. 6 shows a fingerprint 23 of a hand's finger of the human being, where FIG. 6($a$) is a schematic view of the fingerprint 23 which is enlarged while FIG. 6($b$) is a cross sectional view of FIG. 6($a$) taken along the line B-B in FIG. 6($a$).

On the surface of the hand's finger, as is well known, the fingerprint 23 forming various patterns is formed. The pattern in FIG. 6 denotes a spiral fingerprint 23 formed with linear objects 25 in a circular or spiral shape. These linear objects 25 are each formed in a convex shape protruding outward and are disposed intermittently along a longitudinal direction. In addition, the area between the linear objects 25 is formed in a flat portion 27.

Figure 7:
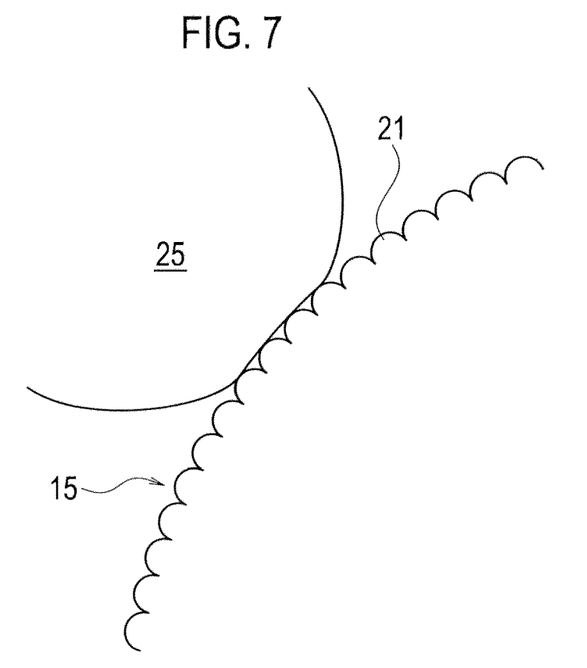
FIG. 7 is an enlarged schematic view showing a state in which a fingerprint of a hand's finger abuts on an edge portion of a concave portion formed on the surface of a door grip.

FIG. 7 is an enlarged schematic view showing a state in which the fingerprint 23 of the hand's finger abuts on the edge portion 15 of the concave portion 11 formed on the surface of the door grip 7.

On the surface of the edge portion 15 of the concave portion 11 drawn at the lower-right part in FIG. 7, like on (or in) other portions, the substantially hemispherical fine convex portions 21 protruding toward the surface side are formed. The convex portions 21 are continuously formed in such a configuration as not having a gap between the adjacent convex portions 21. Moreover, a large hemisphere drawn in the upper-left part in FIG. 7 is the linear object 25 constituting the fingerprint 23 of the hand's finger. According to the present embodiment, four convex portions 21 abut on one linear object 25. As set forth above, when the number of convex portions 21 abutting on the linear object 25 constituting the fingerprint 23 of the hand's finger is four, a tactile organ (not shown in drawings) disposed inside the finger is stimulated, thereby allowing the human being to feel "delicate-and-soft." Here, "delicate" expresses a very sensitive meaning that the human being can recognize by a light touch. Moreover, in FIG. 7, the edge R of the edge portion 15 is 1 mm, the height h of the convex portion 21 is 20 μm, and the diameter d of the convex portion 21 is 40 μm.

Comparative Example

Figure 8:
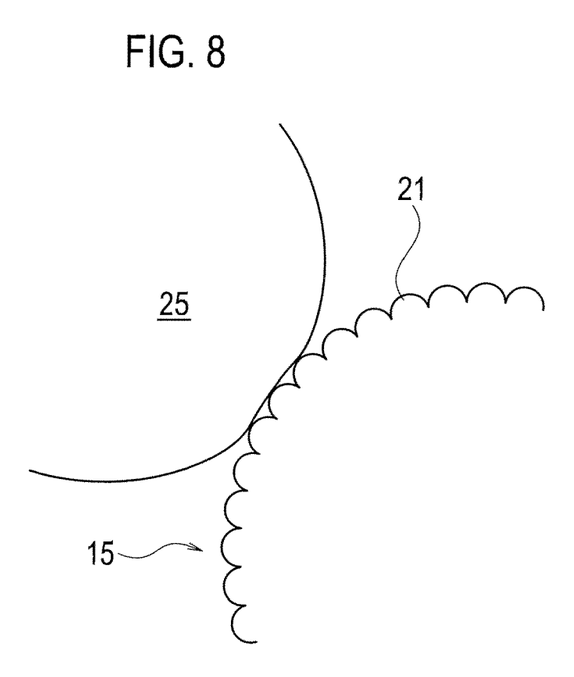
FIG. 8 is an enlarged schematic view showing a state in which a fingerprint of a hand's finger abuts on an edge portion of a concave portion in a door grip according to a comparative example.

FIG. 8 is an enlarged schematic view showing a state in which the fingerprint 23 of the hand's finger abuts on the edge portion 15 of the concave portion 11 in the door grip 7 according to a comparative example.

Contrary to the above-described FIG. 7, as shown in FIG. 8, when the edge R of the edge portion 15 is small, three (less than four) convex portions 21 abut on one linear object 25 constituting the fingerprint 23 of the hand's finger. Thus, when the edge R is small, the curvature factor of the edge portion 15 is large (edge R is small). Therefore, even when the convex portions 21 have the same size or the linear objects 25 of the fingerprint 23 have the same dimension, the number of convex portions 21 abutting on one linear object 25 is decreased, thus preventing the human being from feeling a delicate-and-soft touch feeling which is felt by the fingerprint 23 of the hand's finger. Moreover, in FIG. 8, the edge R of the edge portion 15 is 0.5 mm, the height h of the convex portion 21 is 20 μm, and the diameter d of the convex portion 21 is 40 μm.

Figure 9:
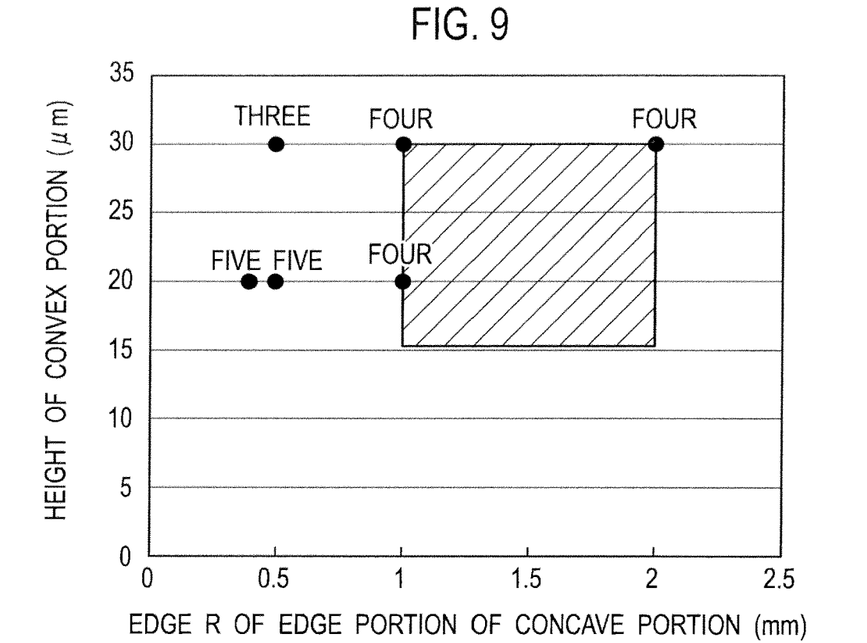
FIG. 9 is a graph showing a relationship between an edge R of an edge portion of a concave portion and a height of a convex portion formed in an edge portion of a concave portion.

FIG. 9 is a graph showing the relationship between the edge R of the edge portion 15 of the concave portion 11 and the height h of the convex portion 21 formed in the edge portion 15 of the concave portion 11.

The abscissa axis of FIG. 9 denotes the edge R (curvature radius) in the edge portion 15 of the concave portion 11 while the ordinate axis of FIG. 9 denotes the height h of the convex portion 21. Moreover, the numbers described above black circles each denote the number of convex portions 21 on which the linear object 25 of the fingerprint 23 abuts.

According to this graph, it is apparent that by setting conditions in a range of a hatched rectangular portion, the linear object 25 of the fingerprint 23 abuts on the four convex portions 21. Specifically, the edge R of the edge portion 15 of the concave portion 11 is in a range of 1 mm to 2 mm, and the height h of the convex portion 21 is in a range of 15 μm to 30 μm. Thus, when the linear object 25 of the fingerprint 23 abuts on the four convex portions 21, the tactile organ on the backside of the fingerprint 23 is stimulated, thus allowing the human being to obtain a delicate-and-soft touch feeling.

Hereinafter, operations and effects of the present embodiment are to be set forth.

(1) In the vehicular interior component according to the present embodiment, a plurality of concave portions 11 are so disposed on the surface as to have intervals relative to each other and a plurality of fine convex portions 21 each having a specified diameter smaller than the diameter of the concave portion 11 are disposed on the surface of at least the edge portion 15 of the concave portion 11. Therefore, when the hand touches the surface of the vehicular interior component, the proper number of convex portions 21 abut on the linear object 25 constituting the fingerprint 23 of the hand's finger, to thereby provide a delicate-and-soft touch feeling.

(2) The concave portion 11 is formed to have the diameter D in a range of 0.5 mm to 2.0 mm and the depth H in a range of 60 μm to 350 μm. In this way, forming the concave portion 11 having a diameter D and a depth H in the specified ranges allows the proper number (four) of convex portions 21 to abut on the linear object 25 constituting the fingerprint 23 of the hand's finger, to thereby provide a delicate-and-soft touch feeling.

(3) The curvature radius R of the cross section in the edge portion 15 of the concave portion 11 is set in a range of 1 mm to 2 mm. In this way, forming the curvature radius D of the cross section in the edge portion 15 of the concave portion 11 in the certain range allows the proper number (four) of convex portions 21 to abut on the linear object 25 constituting the fingerprint 23 of the hand's finger, to thereby provide a delicate-and-soft touch feeling.

(4) The convex portion 21 is formed to have the diameter d in a range of 15 μm to 40 μm and the height h in a range of 15 μm to 30 μm. In this way, forming the concave portion 11 having a diameter d and a height h in the specified ranges allows the proper number (four) of convex portions 21 to abut on the linear object 25 constituting the fingerprint 23 of the hand's finger, to thereby provide a delicate-and-soft touch feeling.

(5) The concave portion is formed in a substantially hemispherical shape. Therefore, dependency on orientation of the linear object 25 of the fingerprint 23 is low, allowing the human being to have a constant touch feeling even when the human being touches the concave portion from any directions.

Example

Hereinafter, the present invention is to be specifically set forth referring to Example.

Figure 10:
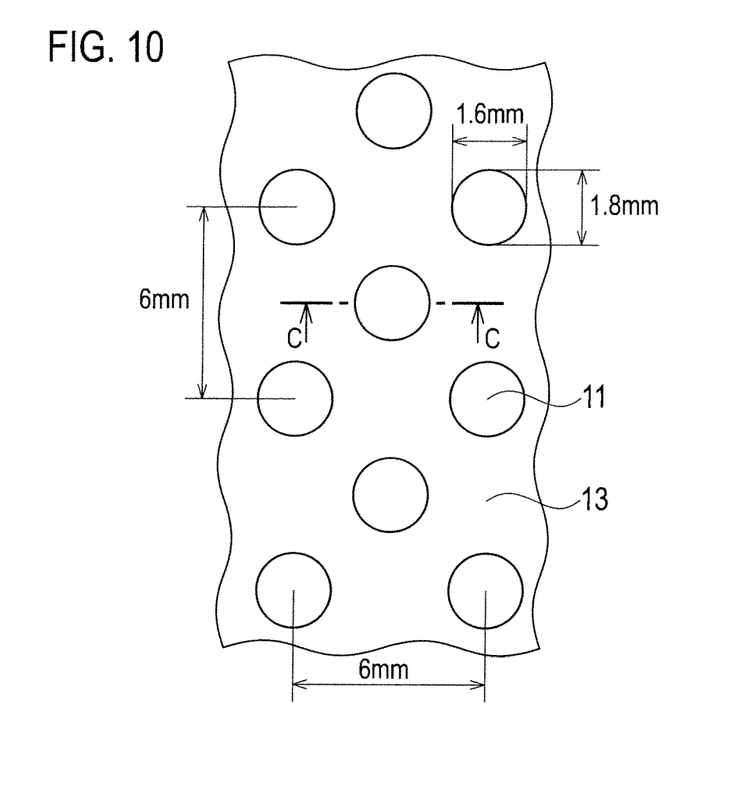
FIG. 10 is an enlarged plan view showing a surface structure of a door handle adopted for Example.
Figure 11:
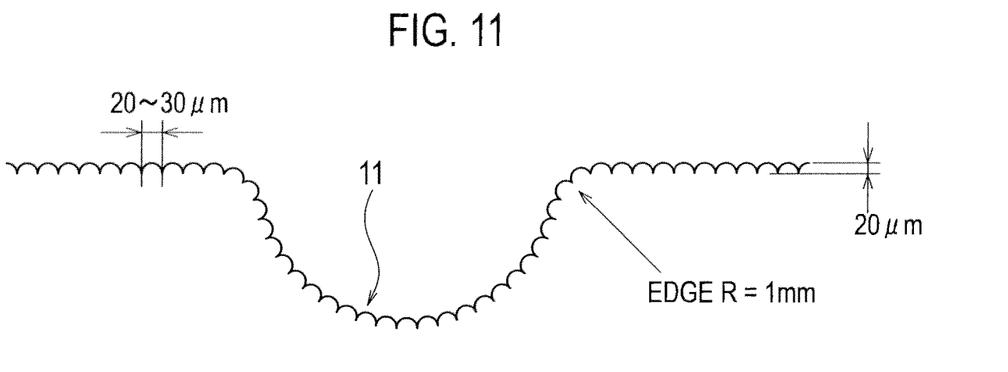
FIG. 11 is an enlarged cross sectional view taken along the line C-C in FIG. 10.

FIG. 10 is an enlarged plan view showing the surface structure of a door handle adopted in Example, and FIG. 11 is an enlarged cross sectional view taken along the line C-C in FIG. 10.

The concave portion 11 shown in FIG. 10 is formed on the internal wall face 9 of the vehicular door grip 7 as shown in FIG. 1. Specifically, each of the concave portions 11 is formed substantially in an elliptical shape which is close to a true circle in plan view, where a long diameter as a length of a long axis is 1.8 mm while a short diameter as a length of a short axis is 1.6 mm. Moreover, in plan view, these concave portions 11 are disposed at apexes of a square having a side of 6 mm, and one concave portion 11 is disposed in the center portion of the square. Many of the thus disposed concave portions 11 are disposed regularly and repeatedly.

Moreover, as shown in FIG. 11, fine convex portions 21 are formed on both the surface of the concave portion 11 and the surface of the plane portion 13. The diameter d of the convex portion 21 is in a range of 20 μm to 30 μm and the height h of the convex portion 21 is 20 μm. Moreover, the edge R of the concave portion 11 is 1 mm.

The touch feeling of the door grip 7 was verified by gripping the door grip 7. It has been found that a more delicate and softer touch feeling was obtained compared with a conventional door grip.

Moreover, the present invention is not limited to the above embodiment, and can be variously varied and modified based on the technical concept of the present invention.

Figure 12:
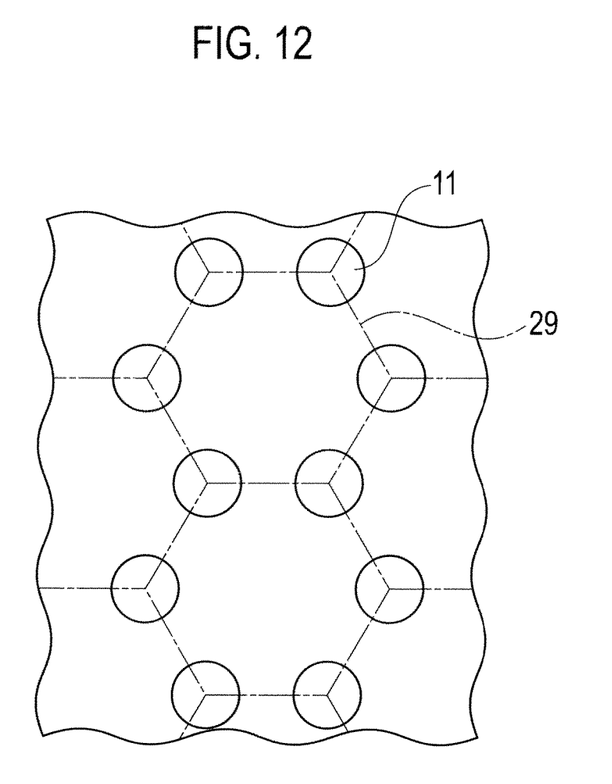
FIG. 12 is a plan view showing locations of the concave portions according to another embodiment.

For example, as shown in FIG. 12, in the case of disposing the concave portions 11 each formed in a hemispherical shape, it is preferable that such hemispherical concave portions 11 are each disposed in a position corresponding to an apex of a regular hexagon 29 denoted by an alternate long and short dashed line. By this, substantially the same touch feeling can be obtained from any directions, i.e., upper, lower, right, left and the like, on the face in FIG. 12.

The entire contents of the Japanese Patent Application No. 2008-293138 (filed on Nov. 17, 2008 in Japan) are incorporated herein by reference, to thereby take some protection against translation errors or omitted portions.

INDUSTRIAL APPLICABILITY

By the surface structure of the article according to the present invention, a plurality of fine convex portions each having a diameter of 15 μm to 40 μm are formed on the surface. Therefore, when the hand's finger of the human being touches the surface, the human being can obtain a delicate-and-soft touch feeling which is felt by the fingerprint of the hand's finger.

The invention claimed is:

1. A surface structure of an article, comprising:
a surface which has a plurality of concave portions on the surface and intervals relative to each of the plurality of concave portions,
wherein each of the plurality of concave portions has a curvature radius ranging from 1 mm to 2 mm at a cross section edge, and has a plurality of fine convex portions arranged next to one another at least on a surface of the edge of each of the plurality of concave portions,
wherein each of the plurality of fine convex portions has a diameter ranging from 15 μm to 40 μm, and a height ranging from 15 μm to less than 30 μm,
wherein centers of the concave portions are disposed in position to correspond to an apex of a regular hexagon in a planar view, and
wherein each of the plurality of concave portions has a diameter ranging from 1.6 mm to 2.0 mm.

2. The surface structure of the article according to claim 1, wherein each of the plurality of concave portions has a depth ranging from 60 μm to 350 μm.

3. The surface structure of the article according to claim 1, wherein each of the plurality of concave portions has a substantially hemispherical shape.

4. The surface structure of the article according to claim 1, wherein the article is a vehicular interior component.

5. The surface structure of the article according to claim 1, wherein the plurality of fine convex portions are arranged without a gap formed between adjacent fine convex portions.

6. The surface structure of the article according to claim 1, wherein a flat plane portion is formed between the concave portions.

7. The surface structure of the article according to claim 1, wherein the diameter of each of the plurality of concave portions ranges from 1.8 mm to 2.0 mm.

8. The surface structure of the article according to claim 1, wherein each of the plurality of fine convex portions is formed in a hemisphere shape, and the height of each of the plurality of fine convex portions ranges from 20 μm to less than 30 μm.

9. The surface structure of the article according to claim 1, wherein each of the concave portions is positioned at a perimeter of the regular hexagon in the planar view.

10. The surface structure of the article according to claim 1, wherein the concave portions are not disposed within the regular hexagon in the planar view.

11. The surface structure of the article according to claim 1, wherein the regular hexagon is formed by six concave portions of the plurality of concave portions, and no part of a concave portion lies within an interior of the regular hexagon other than parts of the six concave portions.

* * * * *